United States Patent [19]

Adams et al.

[11] Patent Number: 4,560,173
[45] Date of Patent: Dec. 24, 1985

[54] MECHANICAL SEAL ASSEMBLY WITH COOLANT CIRCULATION STRUCTURE

[75] Inventors: William V. Adams, Scotts; Duane A. Avard, Schoolcraft, both of Mich.

[73] Assignee: Durametallic Corporation, Kalamazoo, Mich.

[21] Appl. No.: 684,874

[22] Filed: Dec. 21, 1984

Related U.S. Application Data

[63] Continuation-in-part of Ser. No. 616,457, Jun. 1, 1984, abandoned.

[51] Int. Cl.⁴ .......................... F16J 15/34; F16J 15/40
[52] U.S. Cl. ........................................ 277/15; 277/22; 277/65; 277/88; 277/18
[58] Field of Search .................. 277/15–18, 277/22, 65, 68, 69, 70, 71, 72 R, 72 FM, 79, 81 R, 87, 88, 89, 3

[56] References Cited

U.S. PATENT DOCUMENTS

| | | | |
|---|---|---|---|
| 2,127,591 | 8/1938 | Evans | 277/3 |
| 2,226,001 | 12/1940 | La Bour | 277/22 X |
| 2,230,881 | 2/1941 | Browne | 277/22 X |
| 2,710,205 | 6/1955 | Brkich | 277/15 X |
| 2,824,759 | 2/1958 | Tracy | 277/15 |
| 3,004,782 | 10/1961 | Meermans | 277/DIG. 8 X |
| 3,081,095 | 3/1963 | Hamrick | 277/3 X |
| 3,218,085 | 11/1965 | Grace | 277/68 X |
| 3,260,530 | 7/1966 | Jelatis et al. | 277/65 X |
| 3,782,739 | 1/1974 | Kahanek et al. | 277/65 X |
| 3,884,482 | 5/1975 | Ball et al. | 277/17 |
| 4,010,960 | 3/1977 | Martin | 277/3 |
| 4,114,899 | 9/1978 | Kulzer et al. | 277/22 |
| 4,377,290 | 3/1983 | Netzel | 277/65 X |
| 4,466,619 | 8/1984 | Adams | 277/15 |

Primary Examiner—Robert S. Ward
Attorney, Agent, or Firm—Flynn, Thiel, Boutell & Tanis

[57] ABSTRACT

A mechanical seal construction of the double or tandem-type, wherein a stationary ring, preferably the gland ring, is provided with a circulation inducing dam positioned within an annular chamber defined between the inner and outer seals. The dam extends from the downstream side of an outlet to the upstream side of an inlet, whereby rotation of the shaft effectively induces coolant to flow into the chamber through the inlet and then around the chamber to the outlet. The dam has end walls which effectively act as deflectors at both the inlet and outlet to assist the cooling fluid in its entry into and departure from the chamber.

20 Claims, 7 Drawing Figures

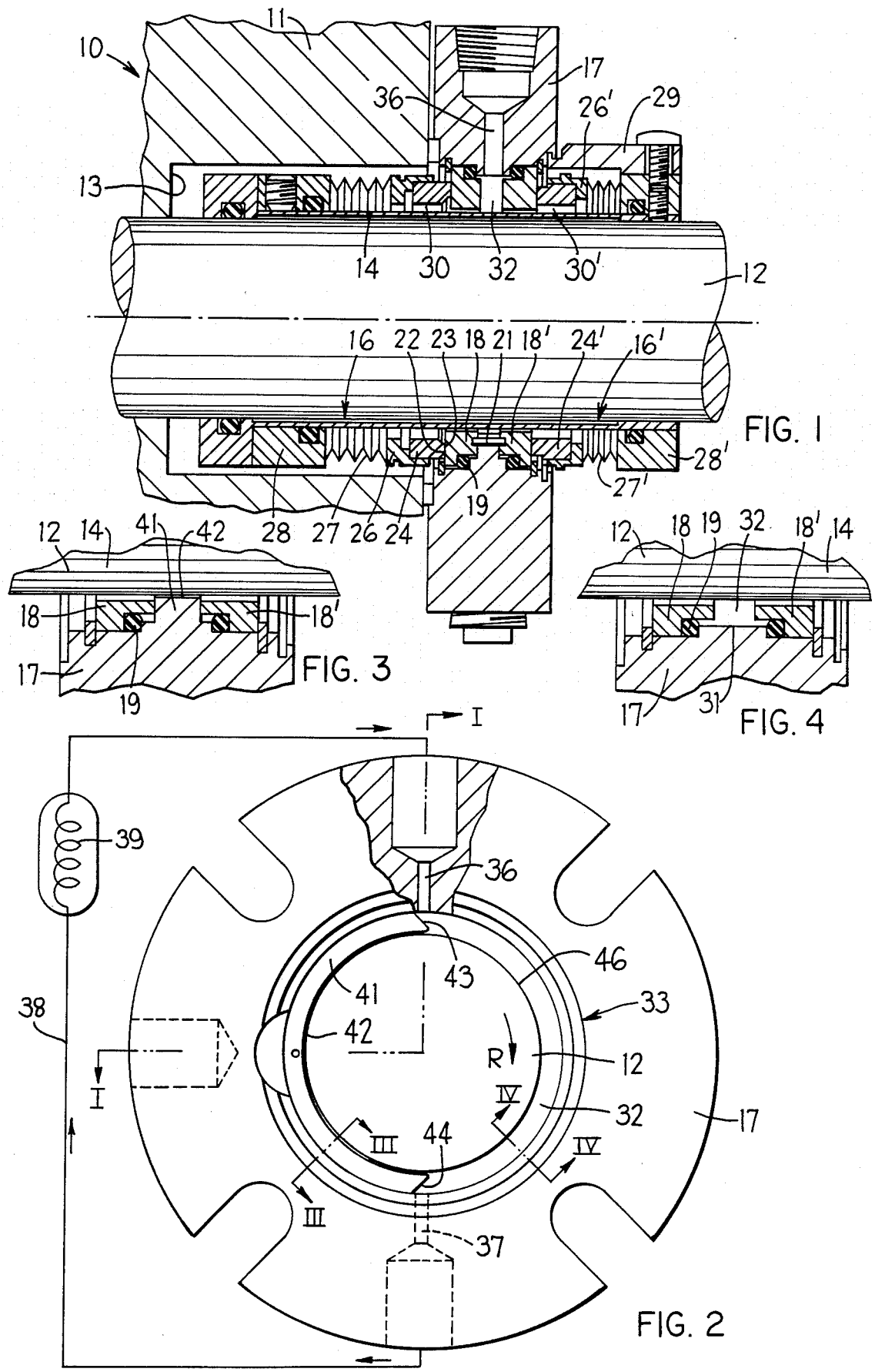

4,560,173

MECHANICAL SEAL ASSEMBLY WITH COOLANT CIRCULATION STRUCTURE

The present application is a continuation-in-part of earlier application Ser. No. 616,457, which was filed on June 1, 1984 and is now abandoned.

FIELD OF THE INVENTION

This invention relates to a mechanical seal construction having an improved coolant circulation structure associated therewith, whereby cooling of the seal construction is optimized without requiring auxiliary pumping equipment.

BACKGROUND OF THE INVENTION

In recent years there has been increased demand for mechanical seal constructions which are of the double or tandem-type so as to permit continued operation of an apparatus even if one of the seals should fail. With this type construction, the stationary seal ring normally has rotatable inner and outer seal rings urged into sliding sealing engagement with opposite axial ends thereof. With this double seal arrangement, an intermediate chamber is formed within the seal construction between the inner and outer seals in surrounding relationship to the shaft, and a buffer or cooling fluid is supplied to this chamber so as to cool the seal faces. The cooling fluid is typically circulated through a closed system by an auxiliary pump disposed externally of the seal construction. With this arrangement, the two seals operate in tandem when the cooling fluid is at a very low pressure so that the inner seal forms the primary seal, but if the high pressure working fluid leaks into the chamber, then the outer seal prevents leakage. Alternately, a high pressure cooling fluid can be supplied to the chamber, which cooling fluid is at a pressure higher than that of the working fluid, whereby the arrangement functions as a double seal for preventing leakage of the working fluid.

While several manufacturers have commercialized double or tandem seal constructions of this latter type over the past several years, nevertheless one of the common drawbacks of these seal constructions is the excessive heat generated thereby, and hence the difficulty of circulating adequate quantities of coolant or buffer fluid therethrough. The necessary circulation has typically been achieved by means of an auxiliary pump disposed externally of the seal construction, although most users have objected to such system since the necessity of using an auxiliary pump increases the complexity and hence unreliability of the system.

In recognition of this problem, namely the adequate circulation of buffer or cooling fluid, one manufacturer has attempted to incorporate a pump within the mechanical seal construction. This has been accomplished by fixedly and concentrically securing an elongated pumping sleeve within the seal rotor in surrounding relationship to the rotatable shaft. This pumping sleeve has a spiral pumping groove formed in the inner periphery thereof. With this arrangement, however, the spiral pumping groove and its small cross section creates a severe restriction on the quantity of fluid which can be pumped or recirculated, and hence the effectiveness of this arrangement is seriously questionable. Further, the pumping sleeve occupies substantial space both axially and radially, whereby the overall seal construction becomes of greater size, and hence will not always fit within the stuffing box on some types of equipment.

Others have used an impeller-type pumping wheel secured to or formed on the seal rotor. This pumping wheel is disposed within the coolant chamber and hence occupies substantial axial and radial space. It also normally requires that the inlet and outlet ports be axially offset. The resulting seal construction is hence more costly, bulky and complex.

Still another attempt to provide increased circulation of coolant through the chamber of a tandem seal construction is illustrated by the arrangement of application Ser. No. 499,416, filed June 2, 1983, now U.S. Pat. No. 4,966,619, owned by the assignee of this invention. The arrangement of the aforesaid application incorporates a pump directly within the mechanical seal construction. This is accomplished by forming the rotatable shaft sleeve as a pumping rotor, such as providing the shaft with a plurality of slots therein in circumferentially spaced relationship. These slots communicate with the coolant chamber disposed between the inner and outer seals, and the coolant is supplied to this chamber through inlet and outlet openings which extend through the gland and are tangentially directed with respect to the pumping rotor. The rotation of the shaft, and of the sleeve carried thereby, hence effects pumping of the cooling fluid within the chamber, thereby effecting circulation of the fluid into and through the chamber and through the closed circuitry without having to rely on an auxiliary pump. While this arrangement has proven to work in a desirable fashion with some tandem seal constructions, nevertheless this arrangement cannot be utilized in all seal constructions inasmuch as it requires utilization of a substantially large shaft sleeve, and hence this arrangement will not always fit within the stuffing box on some equipment due to the radial space requirements.

Accordingly, the present invention relates to an improved mechanical seal construction, specifically a double or tandem-type construction, which overcomes many of the above disadvantages, and which is particularly desirable for use with equipment having minimal radial and axial clearance within the stuffing box. The seal construction of this invention does not require or utilize a rotating pumping rotor or equivalent, but rather provides a stationary ring, such as the gland ring, with a circulation inducing dam positioned within an annular chamber between the inner and outer seals, which dam preferably extends from the downstream side of the outlet to the upstream side of the inlet. The dam effectively closes off that portion of the chamber extending from the outlet to the inlet, whereby rotation of the shaft and surrounding sleeve effectively induces the coolant to flow into the chamber through the inlet and thence around the chamber to the outlet. The dam has end walls which effectively act as deflectors at both the inlet and outlet to assist the cooling fluid in its entry into and departure from the chamber. This arrangement has been experimentally observed to significantly increase the velocity, and hence the quantity, of cooling fluid flowing through the chamber so as to effect proper cooling of the inner and outer seals.

The improved seal construction of the present invention is bidirectional and preferably has radially oriented holes defining the inlet and outlet for the coolant, whereby the use of tangential holes can be avoided.

The circulation inducing dam, in the preferred embodiment of the invention, preferably has the ends thereof, as disposed adjacent the inlet and outlet openings, oriented at an angle of approximately 45° with respect to the radial direction so as to efficiently deflect the cooling fluid in its directional transition both when flowing into the chamber at the inlet, and out of the chamber at the outlet.

The seal construction of this invention is hence desirable for minimal radial and/or axial space requirements, for dissipating seal-generated heat, for controlling temperature at the seal faces or in the seal cavity for high temperature pumping applications, and for use in situations involving shaft rotation in either direction without requiring any seal modifications.

Other objects and purposes of the invention will be apparent to persons familiar with seal constructions of this general type upon reading the following specification and inspecting the accompanying drawings.

BRIEF DESCRIPTION OF THE DRAWINGS

FIG. 1 is a central sectional view of a preferred embodiment of the improved mechanical seal construction to which this invention relates, same being shown in association with a rotatable shaft in a stationary housing, and taken substantially along line I—I in FIG. 2.

FIG. 2 is an elevational view, partially in cross section, illustrating the gland ring in surrounding relationship to the shaft, the other parts of the seal construction being removed for purposes of illustration.

FIGS. 3 and 4 are enlarged, fragmentary sectional views taken substantially along the lines III—III and IV—IV, respectively.

Figure 5:
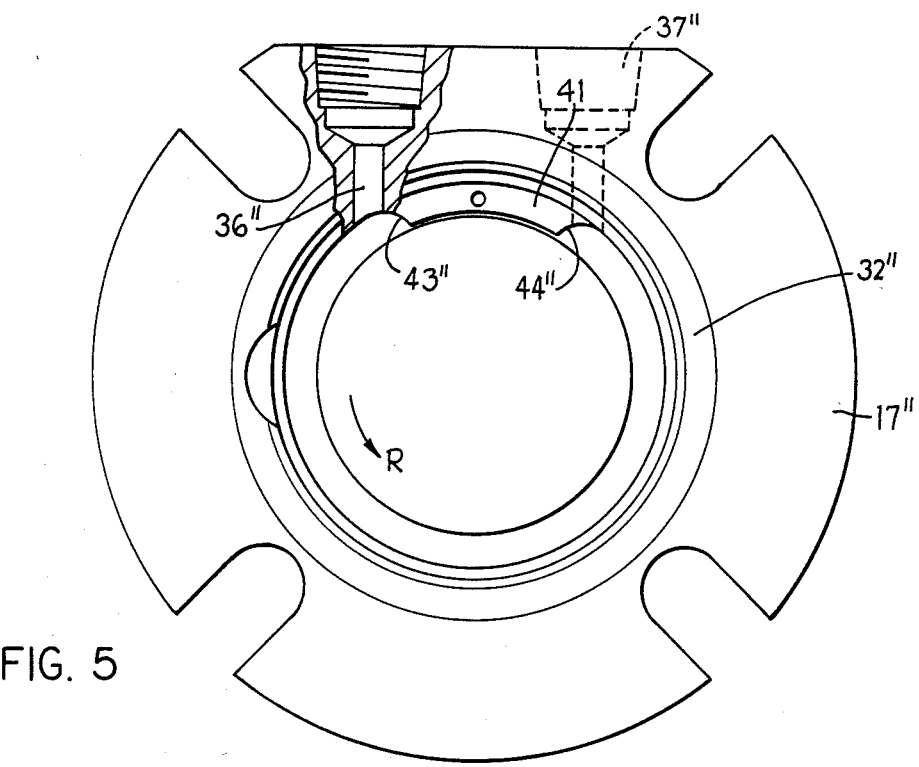
FIG. 5 is a view similar to FIG. 2 but illustrating a variation of the gland ring usable with the FIG. 1 embodiment.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the seal construction and designated parts thereof. Said terminology will include the words specifically mentioned, derivatives thereof, and words of similar import.

DETAILED DESCRIPTION

Referring to the drawings, there is illustrated a preferred embodiment of a mechanical seal construction 10 according to the present invention. This seal construction is associated with a fluid handling apparatus, such as a pumping device having a housing 11 with a rotatable shaft 12 projecting therefrom. The housing 11 defines therein a cylindrical opening 13 (commonly known as a stuffing box) in surrounding relationship to the shaft 12 to accommodate therein the seal construction. The shaft 12 includes, in the illustrated embodiment, an elongated shaft sleeve 14 which surrounds and is non-rotatably secured to the shaft, such as by a set screw or any other conventional means.

As illustrated by FIG. 1, the seal construction 10 is of the double or tandem type in that it includes inner and outer seal arrangements 16 and 16', respectively, both of which cooperate with a common gland ring 17 in the illustrated embodiment. This gland ring 17 concentrically surrounds the shaft sleeve 14 but is disposed in stationary relationship adjacent the end of the stuffing box, such as by being fixedly secured to the housing 11 as by a plurality of fasteners such as screws or bolts.

The inner seal arrangement 16 includes a seal stator formed by an insert ring 18 nonrotatably and sealingly supported concentrically within the gland ring 17 adjacent one axial side thereof. A conventional elastomeric O-ring 19, or other suitable sealing ring, coacts between the gland 17 and the insert 18 for creating a sealed engagement therebetween. A suitable locking pin 21 also cooperates between the gland and insert ring for nonrotatably coupling same together.

The insert 18 is normally constructed of a carbide material and has an annular seal face 22 formed on the exposed axial end face thereof. This seal face 22 normally has a further annular seal face 23 maintained in rotatable sliding engagement therewith, this latter seal face 23 being formed on one end of a seal ring 24. This ring 24 is normally of a carbon graphite material (or alternately a carbide material) and is nonrotatably and concentrically held, as by a press fit, within a mounting ring 26. This mounting ring 26 is nonrotatably coupled to the rotatable shaft sleeve 14 due to the mounting ring being coupled to one end of a conventional expandable and contractible metal bellows 27, which bellows at its other end is coupled to a collar 28, the latter being nonrotatably secured to the shaft sleeve 14. The rings 24 and 26, bellows 27 and collar 28 define a seal rotor assembly which is connected to the shaft sleeve 14 for rotation therewith, and defines therein a coolant chamber 30.

The outer seal arrangement 16' is of a similar construction in that it also includes an insert ring 18' concentrically and nonrotatably positioned within the gland 17 adjacent the other side thereof, this insert ring 18' being maintained in relative sliding and rotatable engagement with a seal ring 24' secured within a mounting ring 26'. This latter ring in turn is coupled through a metal bellows 27' to a mounting collar 28' which is nonrotatably secured to the shaft sleeve 14 adjacent the outer end thereof. This mounting collar 28' has a plurality of axially elongated centering tabs 29 fixed thereto and projecting axially toward the gland 17, which tabs have a rotatable sliding engagement with the gland to assist in maintaining a proper centered relationship.

The gland 17 has an annular central rib 31 which projects radially inwardly of the gland and results in a pair of axially outwardly facing recesses being defined in the gland on opposite sides thereof, which recesses accommodate therein the insert rings 18 and 18'. This central rib 31 results in the insert rings 18 and 18' being axially spaced apart, whereby there is thus defined an annular chamber or region 32 which is disposed axially between the insert rings 18 and 18', and is disposed within the gland 17 in encircling relationship to the shaft sleeve 14. This chamber 32 in turn communicates with chambers 30 and 30' within the seal rotor assemblies.

The annular chamber 32 permits a cooling or buffer fluid to be supplied in the vicinity of the insert rings so as to permit cooling of the seal arrangements. This annular chamber 32 hence defines and comprises a part of a coolant circulating system 33. This system 33 includes inlet and outlet ports 36 and 37 which extend radially through the gland ring 17 for direct communication with the chamber 32. These ports 36 and 37, in the illustrated embodiment, extend radially in substantially perpendicular relationship to the rotational axis of the shaft 12, and in the preferred embodiment are spaced approximately 180° apart so as to communicate with substantially diametrically opposite sides of the chamber 32. These ports 36 and 37 in turn are connected to opposite ends of piping 38, which piping has an appropriate heat exchanger 39 associated therewith. The coolant circulating system 33 hence effectively defines a closed loop system which is free of external pumping devices and the like.

To effect circulation of the cooling or buffer fluid through the system 33, the gland 17 has a circulation inducing dam or cutwater 41 fixed thereto and projecting into the annular chamber 32 so as to obstruct same through a selected arcuate extent. This dam 41, as illustrated by FIG. 3, has an axial width which substantially equals the axial spacing between the insert rings 18 and 18', and has an inner diameter which only slightly exceeds the outer diameter of the shaft sleeve 14 so as to avoid interference therewith, but at the same time provide such minimal clearance as to effectively restrict any significant flow of fluid therebetween.

This dam 41 extends circumferentially of the chamber 32 through a substantial extent. In fact, the dam is provided with a barrier wall 43 at one end thereof which is disposed directly adjacent the upstream side of the inlet port 36, and the dam 41 has a similar barrier wall 44 at the other end thereof positioned directly adjacent the downstream side of the outlet port 37. Hence, the arcuate extent of the chamber extending from the outlet port to the inlet port, when viewed in the direction of shaft rotation as indicated by the arrow R, is hence effectively blocked by the dam 41. The barrier walls 43 and 44 are, as illustrated in FIG. 2, preferably disposed so as to be at a substantial incline with respect to the radial direction defined by the inlet ports 36 and 37. In fact, these barrier walls 43 and 44 preferably are inclined at an angle of about 45° with respect to the radial direction of the respective inlet or outlet port, and each of these barrier walls is radially sloped from the outer to the inner diameter of the dam such that the dam has a greater arcuate extent along the inner diameter than along the outer diameter thereof. Thus, the barrier wall 43 associated with the inlet port hence assists in deflecting the radially inwardly flowing fluid from port 36 into the circumferentially extending portion of the chamber 32, and in a similar fashion the other barrier wall 44 deflects the circumferentially flowing fluid radially outwardly into the outlet port 37.

The rotatable shaft sleeve 14 has the outer surface 46 thereof exposed to that portion of the chamber 32 which extends between the barrier walls 43 and 44 associated with opposite ends of the dam 41. This sleeve wall 46 is normally smooth, although it could be slightly roughened if desired. Use of the smooth surface 46 on the shaft sleeve, however, enables the shaft sleeve to be of minimum radial wall thickness. This smooth external wall 46 of the shaft sleeve, however, nevertheless still functions as a pumping surface when the shaft and shaft sleeve are rotated.

With the tandem or double seal arrangement described above, it has been observed that the rotation of shaft 12 is sufficient to result in the surface 46 thereof to act as a pumping surface and impart to the fluid within the chamber 32 a substantial velocity. Hence, this causes the fluid to circulate through the cavities 30 and 30' and to also move through the chamber 32 until reaching the barrier wall 44 associated with the dam 41, whereupon the fluid is forced outwardly through the opening 37 whereupon it recirculates through the piping 38 and thence is resupplied through the opening 36 into the chamber 32. The rotation of the shaft sleeve 14, when it passes the barrier wall 43 at the upstream end of the dam, is believed to assist in inducing flow of fluid through opening 36 into chamber 32 due to creation of at least a small vacuum in the vicinity of the barrier wall 43. The velocity imparted to the fluid within chamber 32 by shaft surface 46 is sufficient to cause recirculation of the fluid through the closed system, and in fact it has been experimentally observed that this system is capable of recirculating fluid through the system at a rather high velocity so as to permit effective cooling of the inner and outer seals.

In addition, the desirable arrangement as described above is also bidirectional. If the shaft 12 is rotating in the opposite direction (i.e., counterclockwise) from that illustrated in FIG. 2, then in that case the lower port 37 would function as the inlet and the upper port 36 would function as the outlet, and the overall flow of the cooling fluid and performance of the closedloop cooling system would still be the same as described above.

With the arrangement of this invention, it has been observed that use of the dam for obstructing that region of the chamber which extends from the outlet in the direction of rotation to the inlet is highly desirable since such dam or obstruction has been observed to permit substantially greater flow through the coolant chamber. At the same time, this greater flow has been observed to result in the cooling fluid having a substantially reduced temperature differential when measured at the inlet and outlets of the system, which temperature differential has been observed to be about only 1° F. after the system stabilizes, thereby indicating the effectiveness of the cooling being achieved. In addition, and particularly significant, is the fact that the smooth outer surface 46 of the shaft effectively functions as a pumping surface, and since this surface is free of slots or blades, the flow of fluid within the chamber 32 is maintained smooth and laminar, whereby turbulence within the chamber 32 is hence effectively avoided so that more effective flow can thus be achieved. This smooth or laminar flow is additionally achieved by the fact that the dam 42 is provided with a barrier wall 43 positioned directly adjacent the inlet opening 36.

While the invention has been described in relationship to a bellows-type double seal, and use with such seal is highly desirable, nevertheless it will be appreciated that the invention is also applicable to nonbellows-type double seals, and can also be applied to single seals.

A further desirable feature of the present invention is the ability to utilize standard radial bores for the inlet and outlet openings 36 and 37. In the past, attempts have been made to utilize tangentially directed bores so as to attempt to minimize turbulence and increase flow of cooling fluid, although such tangential bores are expensive and difficult to machine. The present invention hence permits elimination of such tangential bores, and at the same time permits substantially increased flow while substantially eliminating turbulence. However, the present invention can utilize tangential bores for the inlet and outlet openings if desired.

For example, referring to FIG. 5, there is illustrated a variation of a gland ring usable with the mechanical seal construction of FIG. 1. In this modified gland ring 17'', the coolant openings 36" and 37" extend through the gland ring so as to be in non-perpendicular relationship with respect to the angular coolant chamber 32", the openings 36" and 37" extending in parallel and perpendicularly from a flat formed on one side of the gland ring to facilitate machining. A dam 41" is integral with the gland and projects radially inwardly of the chamber 32" throughout the arcuate extent between the openings 36" and 37" in the same manner as described above with respect to FIG. 2. In this embodiment, however, the dam 41" has the barrier walls 43" and 44" on the ends thereof sloped in the reverse direction since this enables the walls to be readily machined without significantly affecting the efficiency of the coolant flow. The openings 36" and 37" are disposed with their center lines within a single plane which extends perpendicular with respect to the shaft axis, in the same manner as with the embodiment of FIG. 2. If desired, the center lines of the openings 36" and 37" could be located so as to communicate in tangential relationship with the chamber 32".

Hence, with the improved coolant circulation structure associated with the mechanical seal of this invention, as described above, the overall seal construction creates an integral pumping feature without requiring a separate rotatable blade or vane-type pumping element, or without requiring a rotating pumping rotor involving slots, holes or serrations in order to generate head and flow. The known mechanical seal constructions employing pumping structures have normally required a separate pumping rotor, or the creation of a pumping rotor on the seal rotor by utilizing slots or holes, and such a rotating pumping element have generally required the inlet and outlet ports for the coolant to be located in different planes which are axially spaced apart. The known constructions have also generally required substantial axial and radial space within the seal cavity in order to incorporate the pumping element. These known constructions also generally permit flow through the seal cavity in only one direction due to the required positional relationships of the rotor relative to the inlet and outlet openings, and hence the known seal constructions can be used only when the shaft rotates in a predetermined direction. The known seal constructions must hence be significantly modified in order to work with a shaft which rotates in the opposite direction. In contrast, the improved sealed construction of this invention, as described above, overcomes the above disadvantages in that it permits proper cooling without requiring either internal or external rotatable pumping devices so that the unit can hence be of minimal size, and can also be used in association with shafts which rotate in either direction without requiring any modifications of the seal assembly.

Figure 7:
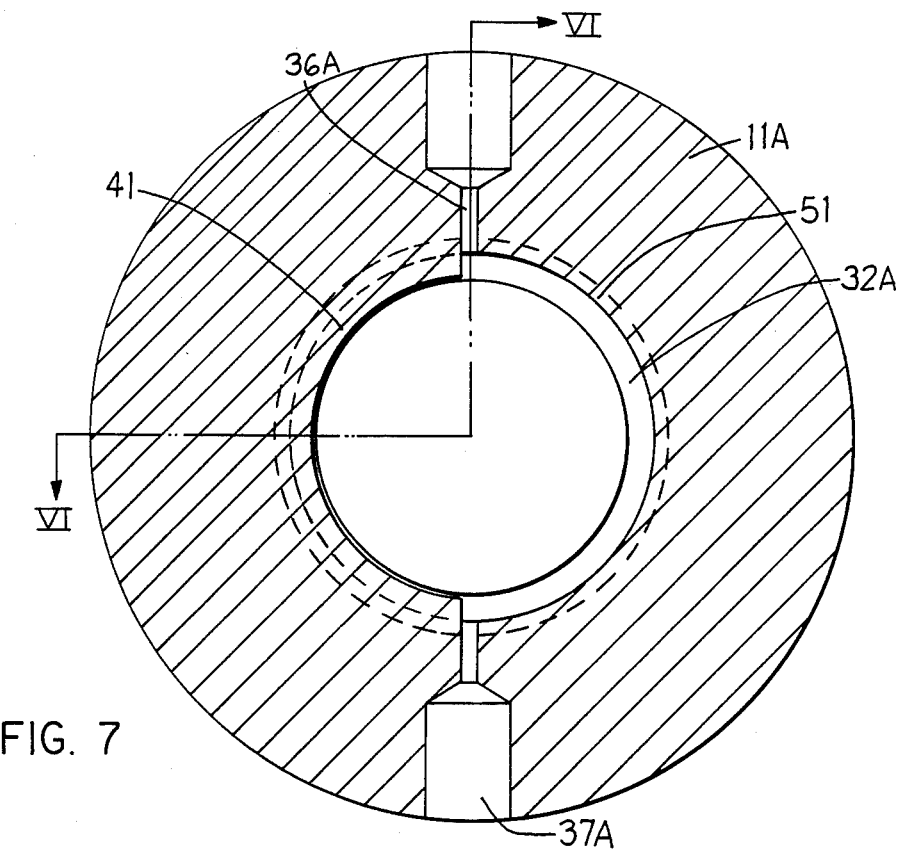
FIG. 7 is a sectional view substantially along line VII—VII in FIG. 6.
Figure 6:
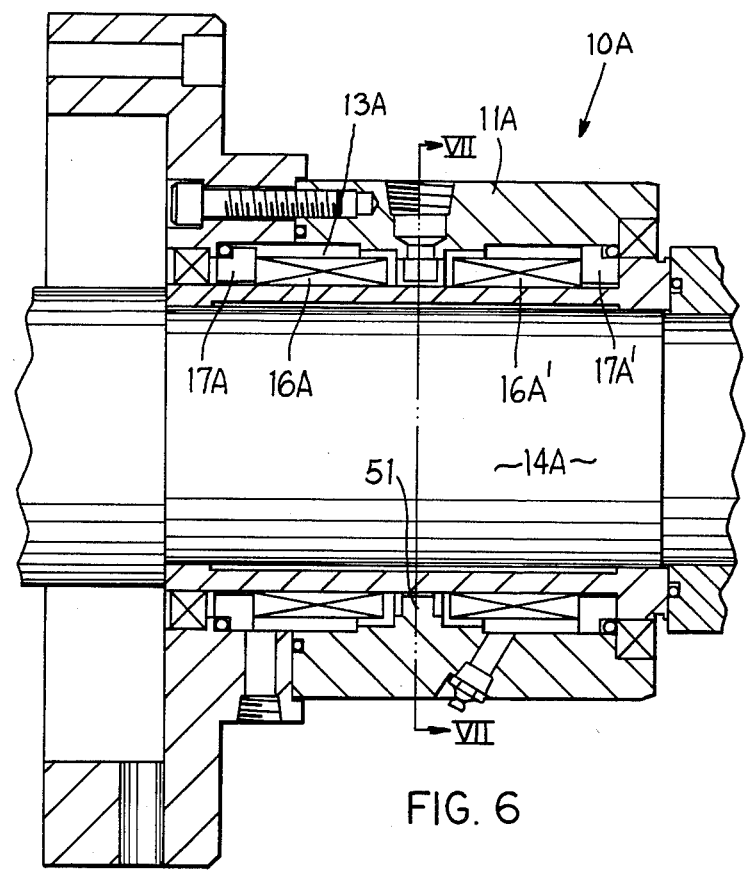
FIG. 6 is a central sectional view of another embodiment involving a double seal construction, as taken substantially along line VI—VI in FIG. 7.

Referring now to FIGS. 6 and 7, there is illustrated a modified seal construction 10A which is of the double type in that it includes inner and outer seal arrangements 16A and 16A', respectively. These seal arrangements are spaced at opposite ends of the housing 11A and individually cooperate with separate gland rings 17A and 17A'. Each of these seal arrangements 16A and 16A' is of a conventional and well known construction so that detailed illustration and explanation thereof is believed unnecessary.

In the seal construction 10A of FIGS. 6 and 7, the seal arrangements are disposed in axially spaced relationship within the stuffing box 13A, and a conventional liquid coolant is circulated through this stuffing box to affect cooling of the seal faces. The stuffing box is connected to external piping so as to define a closed coolant loop in the same manner illustrated by FIG. 2 to effect proper circulation of coolant to, through, and away from the stuffing box 13A. The seal construction 10A is provided with a stationary ring 51 which is fixedly, here integrally, secured to the housing 11A and projects radially inwardly of the stuffing box 13A at a location disposed substantially midway between the seal arrangements 16A and 16A'. This stationary ring 51 concentrically surrounds the shaft sleeve 14A and is appropriately radially spaced therefrom to define an annular chamber 32A. A pair of coolant ports 36A and 37A project, preferably radially, through the housing and the ring 51 for communication with the chamber 32A. Those openings 36A and 37A are preferably spaced apart by about 180° and have their center lines disposed within a single radial plane which perpendicularly intersects the shaft axis. Ring 51 has a dam 41 fixed, here integrally, thereto and projecting radially inwardly therefrom so that the dam has a radially inner surface positioned in close proximity to the exterior surface of the shaft 14A. This dam 41A, as with the embodiment of FIG. 2, preferably extends arcuately between the openings 36A and 37A.

With this embodiment of FIGS. 6 and 7, coolant is supplied through one of the openings, such as 36A, and then flows circumferentially around the chamber 32A for discharge through the other opening 37A. The coolant, due to the communication between the chamber 32A and the stuffing box 13A, hence effects circulation throughout the stuffing box so as to provide for desired cooling of the seal arrangements, specifically in the vicinity of the seal faces. At the same time, the rotation of the shaft is sufficient to effect the desired pumping of the coolant which, coupled with the presence of the dam 41A, effects the desired circulation of the coolant through the closed system.

Although a particular preferred embodiment of the invention has been disclosed for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mechanical seal construction for sealing a shaft means which projects from and is rotatable with respect to a surrounding housing, comprising in combination:

annular seal stator means disposed in surrounding relationship to said shaft means and nonrotatably coupled with respect to said housing, said stator means including an annular gland member nonrotatably coupled to said housing and positioned in substantially concentric and surrounding relationship to said shaft means, said gland member having opening means extending therethrough for accommodating said shaft means, and first and second insert rings disposed within said opening means and sealingly and stationarily mounted on said gland member so as to substantially concentrically surround said shaft means, said first and second insert rings being disposed in axially spaced relationship adjacent the opposite axial sides of said gland member so as to define an annular region therebetween which is closed on the radially outer periphery thereof by said gland member, each of said insert rings defining thereon a stationary annular seal face which faces axially outwardly from one side of the gland member;

first seal rotor means disposed axially adjacent one side of said stator means in surrounding relationship to said shaft means, said first seal rotor means being nonrotatably and sealingly fixed to said shaft means and having an annular axially directed seal face on one end thereof maintained in rotatable and slidable engagement with the seal face on said first insert ring;

second seal rotor means disposed axially adjacent the other side of said stator means in surrounding relationship to said shaft means, said second rotor means being sealingly and nonrotatably fixed to said shaft means and defining thereon an annular axially directed seal face which is maintained in rotatable and slidable engagement with the seal face on said second insert ring; and cooling means defining a closed system for effecting recirculation of coolant through a determined arcuate extent of said annular region, said cooling means including first and second openings extending through said gland member and communicating with said annular region at circumferentially spaced locations, said first and second openings functioning as a coolant inlet and a coolant outlet respectively, said first and second openings each communicating with said annular region in substantially perpendicular relationship with respect to the rotational axis of said shaft means, and closed piping means disposed externally of said gland member and connected between said first and second openings for defining a closed system permitting coolant to be recirculated from said outlet back to said inlet;

said cooling means including obstruction means having a first portion fixed to said gland member and projecting into said annular region at a first location disposed directly adjacent the downstream side of said outlet for directing the coolant within said annular region to flow radially outwardly through said outlet, said obstruction means also including a second portion fixed to said gland member at a second location directly adjacent the upstream side of said inlet and projecting radially inwardly into said annular region for substantially obstructing the cross section thereof, the annular region as it extends angularly from the inlet in the direction of shaft rotation to the outlet being of substantial radial and axial cross-sectional dimensions and being free of obstructions for defining an arcuate passage which is part of said closed system and is of substantial arcuate extent.

2. A seal construction according to claim 1, wherein said shaft means has a smooth outer annular surface which defines the radially inner boundary of said annular region and which functions as a pumping surface when the shaft means is rotated.

3. A seal construction according to claim 2, wherein said first portion of said obstruction means has a barrier wall which confronts and effectively closes off the downstream end of said arcuate passage directly adjacent the downstream side of said outlet, said barrier wall extending at a substantial angle with respect to the radial direction so as to extend in the upstream direction as it projects radially inwardly to define a deflector wall which assists in deflecting the coolant from the arcuate passage radially outwardly into the outlet.

4. A seal construction according to claim 3, wherein the second portion of said obstruction means has a barrier wall on the upstream side thereof which faces and closes off the other end of said arcuate passage directly adjacent the upstream side of said inlet, said last-mentioned barrier wall being inclined at a substantial angle relative to the radial direction so as to project in the downstream direction as it projects radially inwardly to assist in deflecting the coolant as it flows from the inlet into the upstream end of said arcuate passage.

5. A seal construction according to claim 4, wherein said obstruction means comprises an elongated arcuate rib which is integrally fixed to said gland member and projects radially into the annular region between said first and second inserts, said rib extending arcuately from said first location in the direction of shaft rotation to said second location.

6. A seal construction according to claim 1, wherein said obstruction means comprises an elongated arcuate rib which is integrally fixed to said gland member and projects radially into the annular region between said first and second inserts, said rib extending arcuately from said first location in the direction of shaft rotation to said second location.

7. A seal construction according to claim 6, wherein said shaft means has a smooth outer annular surface which defines the radially inner boundary of said annular region and which functions as a pumping surface when the shaft is rotated.

8. A seal construction according to claim 1, wherein the closed system is free of rotating pumping devices.

9. In a mechanical seal construction for creating a sealed relationship between a housing and a rotatable shaft, said seal construction including a seal rotor disposed within a cavity in the housing in surrounding relationship to the shaft and being sealingly and nonrotatably coupled thereto, the seal rotor defining an annular and axially directed rotatable seal face formed on one axial end thereof, and gland means disposed in surrounding relationship to said shaft and stationarily secured relative to said housing, said gland means having an insert ring stationarily and sealingly mounted thereon and provided with an annular axially directed stationary seal face formed thereon and maintained in sliding sealing engagement with said rotatable seal face, the improvement comprising:

a closed circulation system for recirculating coolant to effect cooling of said seal faces, said system including a substantially annular region formed interiorly of said gland member in surrounding relationship to said shaft and positioned directly axially adjacent the rear side of said insert ring, first and second openings extending through said gland member for communication with said annular region at circumferentially spaced locations, external conduit means connected between the outer ends of said first and second openings for defining a closed circuit for coolant, said external conduit means being free of external pumping devices, and obstruction means fixed to said gland member and projecting into and substantially closing off said annular region to prevent flow of coolant through that portion of the annular region which extends from said second opening in the direction of shaft rotation to said first opening, the remainder of said annular region extending from said first opening in the direction of shaft rotation to said second opening defining an elongate arcuate passage for permitting coolant to flow therethrough, said shaft having a substantially smooth outer surface which defines the radially inner boundary of said annular region.

10. A seal construction according to claim 9, wherein said obstruction means includes a barrier wall at each end thereof, one of said barrier walls as disposed adjacent the inlet end of said arcuate passage being sloped to extend in the flow direction as the barrier wall projects radially inwardly across the annular region, and the other barrier wall being disposed adjacent the outlet end of the arcuate passage and being sloped so as to project in the upstream direction as the wall projects radially inwardly across the annular region.

11. A seal construction according to claim 9, wherein said arcuate passage has axial and radial dimensions which are of similar magnitude.

12. A seal construction according to claim 9, wherein said first and second openings extend radially through the gland member in substantially perpendicular relationship to the rotational axis of said shaft and are disposed with the centerlines thereof substantially within a single plane which extends perpendicularly with respect to said rotational axis.

13. A seal construction according to claim 9, wherein the closed system is also free of rotatable pumping devices within the housing cavity.

14. In a mechanical seal construction for creating a sealed relationship between a housing and a rotatable shaft, said seal construction including a seal rotor disposed within a cavity in the housing in surrounding relationship to the shaft and being sealingly and nonrotatably coupled thereto, the seal rotor defining an annular and axially directed rotatable seal face formed on one axial end thereof, and a nonrotatable seal ring disposed in surrounding relationship to said shaft and nonrotatably secured relative to said housing, said nonrotatable seal ring having an annular axially directed stationary seal face formed thereon and maintained in sliding sealing engagement with said rotatable seal face, the improvement comprising:

a closed circulation system for recirculating coolant to effect cooling of said seal faces, said system including a ring portion which is nonrotatably secured to the housing in surrounding relationship to said shaft, said ring portion being radially spaced from said shaft to form a substantially annular region therebetween, first and second openings extending through said ring portion for communication with said annular region at circumferentially spaced locations, said first and second openings being disposed with the center lines thereof substantially within a single plane which extends perpendicular to the rotational axis of the shaft, external conduit means connected between the outer ends of said first and second openings for defining a closed circuit for coolant, said external conduit means and said cavity being free of rotatable pumping devices, and obstruction means fixed to said ring portion and projecting into and substantially closing off said annular region to prevent flow of coolant through that portion of the annular region which extends from said second opening in the direction of shaft rotation to said first opening, the remainder of said annular region extending from said first opening in the direction of shaft rotation to said second opening defining an elongate arcuate passage for permitting coolant to flow therethrough, said shaft having a substantially smooth outer surface which defines a radially inner boundary of said annular region.

15. A seal construction according to claim 14, wherein said stationary ring portion comprises a gland ring having said nonrotatable seal ring mounted thereon.

16. A seal construction according to claim 14, wherein a pair of said seal rotors are disposed within the housing cavity adjacent opposite axial ends thereof and respectively maintained in sliding sealing engagement with a pair of said nonrotating seal rings which are disposed adjacent the opposite axial ends of said cavity and are nonrotatably secured relative to the housing, said ring portion being disposed axially between said seal rotors.

17. In a mechanical seal construction for creating a sealed relationship between a housing having a cavity therein and a rotatable shaft which projects coaxially of the cavity, said seal construction including first and second seal units disposed adjacent the opposite axial ends of the cavity for creating a sealed relationship between the shaft and the housing, each seal unit including a nonrotatable seal ring which is nonrotatably secured to the housing in surrounding relationship to the shaft and a rotatable seal ring which is nonrotatably secured to the shaft in surrounding relationship thereto, the rotating and nonrotating seal rings having opposed annular and axially directed seal faces which are disposed in sliding and sealing engagement with one another, the improvement comprising:

a closed circulation system for recirculating coolant through the cavity to effect cooling of the seal faces, said system including an annular wall part of said housing disposed in surrounding relationship to the shaft and defining a part of the annular exterior surface of the cavity at an axial location between the first and second seal units, said annular wall part being radially spaced from the exterior surface of the shaft for defining a substantially annular region therebetween, first and second coolant openings extending radially through said annular wall part for communication with said annular region at circumferentially spaced locations, said first and second openings being disposed with the center lines thereof substantially within a single plane which extends perpendicularly with respect to the rotational axis of the shaft, external conduit means connected between the outer ends of said first and second openings for defining a closed circuit for coolant, said external conduit means and said cavity being free of rotatable pumping devices, and obstruction means fixed to said annular housing part and projecting radially inwardly thereof into and substantially closing off said annular region to prevent flow of coolant through that portion of that annular region which extends from said second opening in the direction of shaft rotation to said first opening, the remainder of said annular region extending from said first opening in the direction of shaft rotation to said second opening defining an elongate arcuate passage for permitting coolant to flow therethrough, said shaft having a substantially smooth outer surface which defines the radially inner boundary of said annular region.

18. A seal construction according to claim 17, wherein said obstruction means includes a barrier wall at each end thereof, one said barrier walls as disposed adjacent the inlet end of said arcuate passage being sloped to extend in the flow direction as the barrier wall projects radially inwardly across the annular region, and the other barrier wall being disposed adjacent the outlet end of the arcuate passage and being sloped as to project in the upstream direction as the wall projects radially inwardly across the annular region.

19. A seal construction according to claim 17, wherein said annular housing part is intergal with said housing and includes a ringlike portion which surrounds the shaft and projects radially inwardly of said cavity, said ringlike portion having said obstruction means intergal therewith and projecting radially inwardly thereof.

20. A seal construction according to claim 1, wherein said first and second openings have the centerlines thereof disposed substantially within a single plane which extends perpendicularly with respect to the rotational axis of said shaft.

* * * * *